US011988134B2

(12) United States Patent
Petrov

(10) Patent No.: US 11,988,134 B2
(45) Date of Patent: May 21, 2024

(54) SWITCHING RACK FOR A VARIABLE COMPRESSION RATIO CONNECTING ROD AND A VEHICLE COMPRISING SUCH A SWITCHING RACK

(71) Applicant: Volvo Car Corporation, Gothenburg (SE)

(72) Inventor: Peter Petrov, Angered (SE)

(73) Assignee: Volvo Car Corporation, Gothenburg (SE)

( * ) Notice: Subject to any disclaimer, the term of this patent is extended or adjusted under 35 U.S.C. 154(b) by 625 days.

(21) Appl. No.: 16/621,299

(22) PCT Filed: Jul. 9, 2018

(86) PCT No.: PCT/SE2018/050750
§ 371 (c)(1),
(2) Date: Dec. 11, 2019

(87) PCT Pub. No.: WO2019/013692
PCT Pub. Date: Jan. 17, 2019

(65) Prior Publication Data
US 2021/0301717 A1 Sep. 30, 2021

(30) Foreign Application Priority Data
Jul. 13, 2017 (SE) .................................... 1750919-1
Jan. 10, 2018 (EP) .................................... 18150932

(51) Int. Cl.
*F02B 75/04* (2006.01)

(52) U.S. Cl.
CPC .................................. *F02B 75/045* (2013.01)

(58) Field of Classification Search
CPC ............................... F02B 75/045; F02B 75/04
(Continued)

(56) References Cited

U.S. PATENT DOCUMENTS 8,667,934 B1 * 3/2014 Woo ...................... F02B 75/045 123/48 B
2012/0118270 A1 5/2012 Lee
(Continued)

FOREIGN PATENT DOCUMENTS

DE 202014010758 U1 7/2016
DE 102015106315 A1 10/2016
(Continued)

OTHER PUBLICATIONS

Aug. 29, 2018 International Search Report issued on International Application No. PCT/SE2018/050750.
(Continued)

*Primary Examiner* — Lindsay M Low
*Assistant Examiner* — Omar Morales
(74) *Attorney, Agent, or Firm* — Clements Bernard Walker; Christopher L. Bernard

(57) ABSTRACT

A combustion engine comprising a switching rack and a plurality of connecting rods, where the switching rack comprises a longitudinal body having a face side and a rear side, where the face side comprises a plurality of switching arrangements where each switching arrangement comprises a first cam and a second cam, where each switching arrangement is adapted to interact with a switch on a connecting rod, and where the switching rack is arranged in a gliding manner in a groove between a cylinder block and an engine bedplate of the combustion engine. The advantage of the invention is that a means for switching a variable compression switch in a connecting rod in a combustion engine can be mounted in a simple and reliable manner.

17 Claims, 6 Drawing Sheets

(58) Field of Classification Search
USPC ........................................................ 123/48 B
See application file for complete search history.

(56) References Cited

U.S. PATENT DOCUMENTS

| | | | | |
|---|---|---|---|---|
| 2015/0260109 A1* | 9/2015 | Wittek | .................... | F02B 75/04 29/888.011 |
| 2016/0281614 A1* | 9/2016 | Paul | ........................ | F02D 15/02 |
| 2017/0089257 A1 | 3/2017 | Schaeffler et al. | | |
| 2018/0142617 A1* | 5/2018 | Weiss | ...................... | F16C 23/10 |

FOREIGN PATENT DOCUMENTS

| | | | |
|---|---|---|---|
| DE | 102015113619 | A1 | 2/2017 |
| DE | 102015224157 | A1 | 6/2017 |
| WO | 2014019684 | A1 | 2/2014 |
| WO | 2015200432 | A1 | 12/2015 |

OTHER PUBLICATIONS

Feb. 9, 2018, Office Action issued in Patent Application No. 1750919-1, International classification (IPC) F02B75/04, F02D I 5/02, F 16C7 /06 for Applicant Volvo Car Corporation.

* cited by examiner

SWITCHING RACK FOR A VARIABLE COMPRESSION RATIO CONNECTING ROD AND A VEHICLE COMPRISING SUCH A SWITCHING RACK

CROSS-REFERENCE TO RELATED APPLICATION

The present disclosure claims the benefit of priority of co-pending European Patent Application No. 18150932.4, filed on Jan. 10, 2018 and PCT Patent Application No. PCT/SE2018/050750, filed on Jul. 9, 2018, the contents of both of which are incorporated in full by reference herein.

TECHNICAL FIELD

The present invention relates to a switching rack adapted to switch a mechanical switch in a variable compression ratio system integrated in a connecting rod for a vehicle engine.

BACKGROUND

Vehicles comprising an internal combustion engine are subjected to a plurality of different legislative requirements and regulations. Some of these requirements and regulations are directed to fuel consumption and exhaust emission. One way of reducing fuel consumption is to provide the internal combustion engine of the vehicle with a variable compression ratio, which is a technology used to adjust the compression ratio of the internal combustion engine while the engine is in operation. This technology is used to increase the fuel efficiency of the engine when the load varies. Higher loads require lower compression ratios to be more efficient and vice versa. Engines comprising variable compression ratio allows the volume above the piston at Top dead centre to be changed. For automotive use this needs to be done dynamically in response to the load and driving demands.

The advantage of an engine having a variable compression ratio is that the maximum pressure during a compression stroke can be limited at high power outputs, and can be increased at lower power outputs. If the compression of the engine is too high for the used fuel, the fuel/air mixture will “detonate” and will not burn in a proper way. In a conventional internal combustion engine, higher power outputs at the same speed is achieved by injecting more fuel. For a high performance vehicle, more air may be forced into the engine by the use of a turbocharger or a supercharger which increases the inlet pressure. A high load and a high compression ratio may lead to a too high pressure in the cylinder, which in turn may result in detonation of the fuel/air mixture. One way of avoiding detonation is to delay the spark ignition timing, but this will affect the efficiency of the engine in a negative way. By decreasing the compression ratio, i.e. increasing the volume above the piston, the compression ratio can be limited to a safe value. If the compression ratio is fixed to this safe value, the engine may lack power and torque under lighter loads. By using a variable compression ratio, the compression ratio can be adapted to the actual load of the vehicle. By using an engine with variable compression ratio, a high compression ratio can be obtained at lighter loads that will provide a higher thermal efficiency of the engine, and a low compression ratio can be obtained at higher loads which will avoid knocking of the engine and which will allow an optimal ignition timing.

There are different known ways of providing an internal combustion engine with a variable compression ratio. Some systems comprise an eccentric arrangement on the crankshaft that will adjust the effective length of the connecting rod, which in turn adjusts the compression of the engine. Some systems comprise cylinders in the connecting rod which acts on an eccentric mount for the piston, which also adjusts the effective length of the connecting rod. Another proposed system comprises a tiltable cylinder head with connecting rods having a fixed length.

WO 2014/019684 A1 discloses a switching rack adapted to actuate a switch arranged at the lower side of a connecting rod, where the switching rack is arranged at the bottom of the engine bedplate, below the crankshaft. Such a mounting position requires several components and is relatively complicated.

There is thus room for an improved way of mounting a switching rack in a combustion engine.

SUMMARY

An object of the invention is therefore to provide a combustion engine having an improved mounting position of a switching rack for controlling a switch valve unit comprised in a connecting rod. A further object of the invention is to provide a vehicle that comprises such a combustion engine.

The solution to the problem according to the invention is described in the characterizing part of claim 1 regarding the combustion engine and in claim 13 regarding the vehicle. The other claims contain advantageous further developments of the inventive combustion engine.

In a combustion engine comprising a switching rack and a plurality of connecting rods, where the switching rack comprises a longitudinal body having a face side and a rear side, where the face side comprises a plurality of switching arrangements, where each switching arrangement comprises a first cam and a second cam, where each switching arrangement is adapted to interact with a switch on a connecting rod, the object of the invention is achieved in that the switching rack is arranged in a gliding manner in a groove between a cylinder block and an engine bedplate of the combustion engine.

The internal combustion engines is provided with an ignition system and can be used for petrol engines and engines using compressed natural gas or liquefied natural gas. The switching rack is used to switch a switch between a first position and a second position. The switch is positioned in a connection rod arranged between a crankshaft and a piston. In the shown system, the switch is arranged in the upper part of the connecting rod, above the split line. The switch is arranged at one side of the connecting rod. The switch will switch between two pressurized oil channels comprised in the connecting rod. In one position, the switch will allow oil to flow to a first cylinder arranged at the mount position of the piston. The first cylinder will position the piston mount in a first, raised position, such that the effective length of the connecting rod will be at its longest extension which corresponds to a high compression ratio. In the second position, the second cylinder will position the piston mount in a second, lower position in which the effective length of the connecting rod is shorter. This will in turn provide a lower compression in the cylinder.

The switching rack can slide sideways such that either the first cam or the second cam will interact with the switch of the connecting rod. The sideway position of the switching rack is controlled by an actuator acting on an actuating lever. The switching rack will either be positioned to the right or to the left, having two predefined positions. With the switching rack positioned to the right, the switch will be pushed to a first position every time the switch passes the switching rack, i.e. at every revolution. The first position may e.g. allow oil to flow to the first cylinder and to drain oil from the second cylinder, such that the piston mount is in the raised position. With the switching rack positioned to the left, the switch will be pushed to a second position every time the switch passes the switching rack, i.e. at every revolution. The second position may e.g. allow oil to flow to the second cylinder, such that the piston mount is in the lower position.

The switching rack is mounted in a groove between the cylinder block and the engine bedplate of the combustion engine. In one example, the switching rack is mounted in a groove in the bottom of the cylinder block of the engine. The switching rack is placed in the groove, and when the engine bedplate is mounted to the cylinder block, the switching rack is mounted in the correct position without the need of any screws or additional fixing means. This is an advantage over known switching rack solutions, where the switching rack is mounted at the bottom of the bedplate or at the bottom of the cylinder block for a deep-skirt block. Such a mounting position requires additional screws, fixing elements, specific end stops and also additional screws and fixing elements for the actuator. The actuator must further be mounted with a specific flange on the oil sump and requires a relatively long actuation shaft in order to reach the switching rack. In the inventive solution, the actuator is mounted on the outside of the bedplate, very close to the switching rack.

A further disadvantage of the known solution is that the connecting rod itself is more complicated. In a known solution with the switching rack at the bottom of the bedplate, the switch of the connecting rod is mounted on the bottom of the connecting rod. The oil lines to the adjusting cylinders must thus also pass through the split plane of the connecting rod.

The switching rack is provided with two end stops that will provide the proper operation positions, i.e. the correct right and left position. The body of the switching rack is rectangular, and resembles a strip of steel. This will prevent the switching rack from rotating in the groove and will maintain the switching rack in a correct vertical and horizontal position.

BRIEF DESCRIPTION OF DRAWINGS

The invention will be described in greater detail in the following, with reference to the attached drawings, in which.

DESCRIPTION OF EMBODIMENTS

The embodiments of the invention with further developments described in the following are to be regarded only as examples and are in no way to limit the scope of the protection provided by the patent claims.

Figure 1:
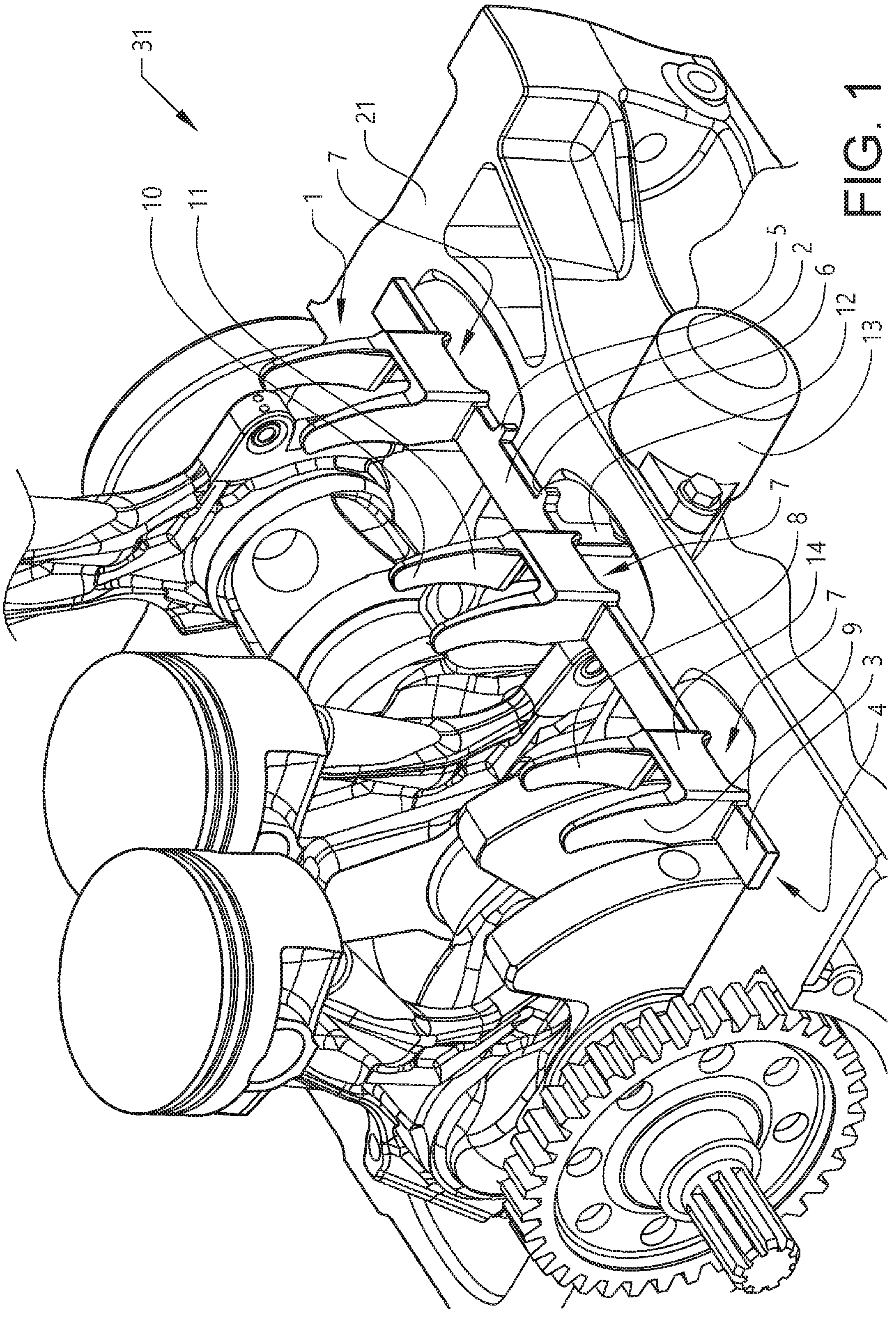
FIG. 1 shows a switching rack according to the invention standing on a bedplate.

FIG. 1 shows a switching rack 1 standing on an engine bedplate 21 of an internal combustion engine 31. The switching rack 1 is provided with a longitudinal body 2 which comprises longitudinal regions and which interconnects the switching arrangements 7 of the switching rack 1. The body 2 is provided with a face side 3 which is pointing upwards in the figure. The rear side 4 is at the opposite side. The switching rack 1 is also provided with a first protruding end stop 5 and a second protruding end stop 6. The rear side 4 is provided with an actuating lever 12 that is controlled by an actuator 13 mounted on the outside of the bedplate 21. The actuator 13 controls the switching rack 1 to either a right position or a left position. The actuator 13 is provided with a sealing that will prevent oil from escaping through the mounting hole for the axle of the actuator. The actuator 13 is here a rotary electric motor with an eccentric wheel acting on the actuating lever 12. A linear actuator, such a solenoid, would also be possible to use.

A switching arrangement 7 is provided at each cylinder of the engine. In the shown example, a three cylinder engine is used as an example, but any number of cylinders is plausible. The switching arrangement 7 extends from the body 2 of the switching rack 1 in a substantial perpendicular direction from the face side 3 of the body 2. A switching arrangement 7 comprises a first cam 8 and a second cam 9, which are spaced apart such that the connecting rod attachment to the crankshaft with the switch can pass between the cams. The first cam 8 and the second cam 9 are interconnected with an interconnection 14, which also helps to stabilize the switching rack 1. The upper part of a cam comprises an entrance region 10 and the lower part of a cam comprises a switching region 11, which will interact with the switch of the connecting rod. The entrance region will allow the switch to enter the switching region in a gentle way. The entrance region has a shape of a ramp that will allow a smooth movement of the actuating means of the switch without creating audible noise and which will further prevent excessive wear of the switch and the entrance region.

The entrance region 10 and the switching region 11 are provided on an inner surface of a cam. The inner surface of the first cam 8 and the inner surface of the second cam 9 are directed towards each other. The inner surfaces are slightly angled outwards with respect to a centre plane between the first cam 8 and the second cam 9, such that the distance between the entrance regions is larger than the distance between the switching regions.

Figure 2:
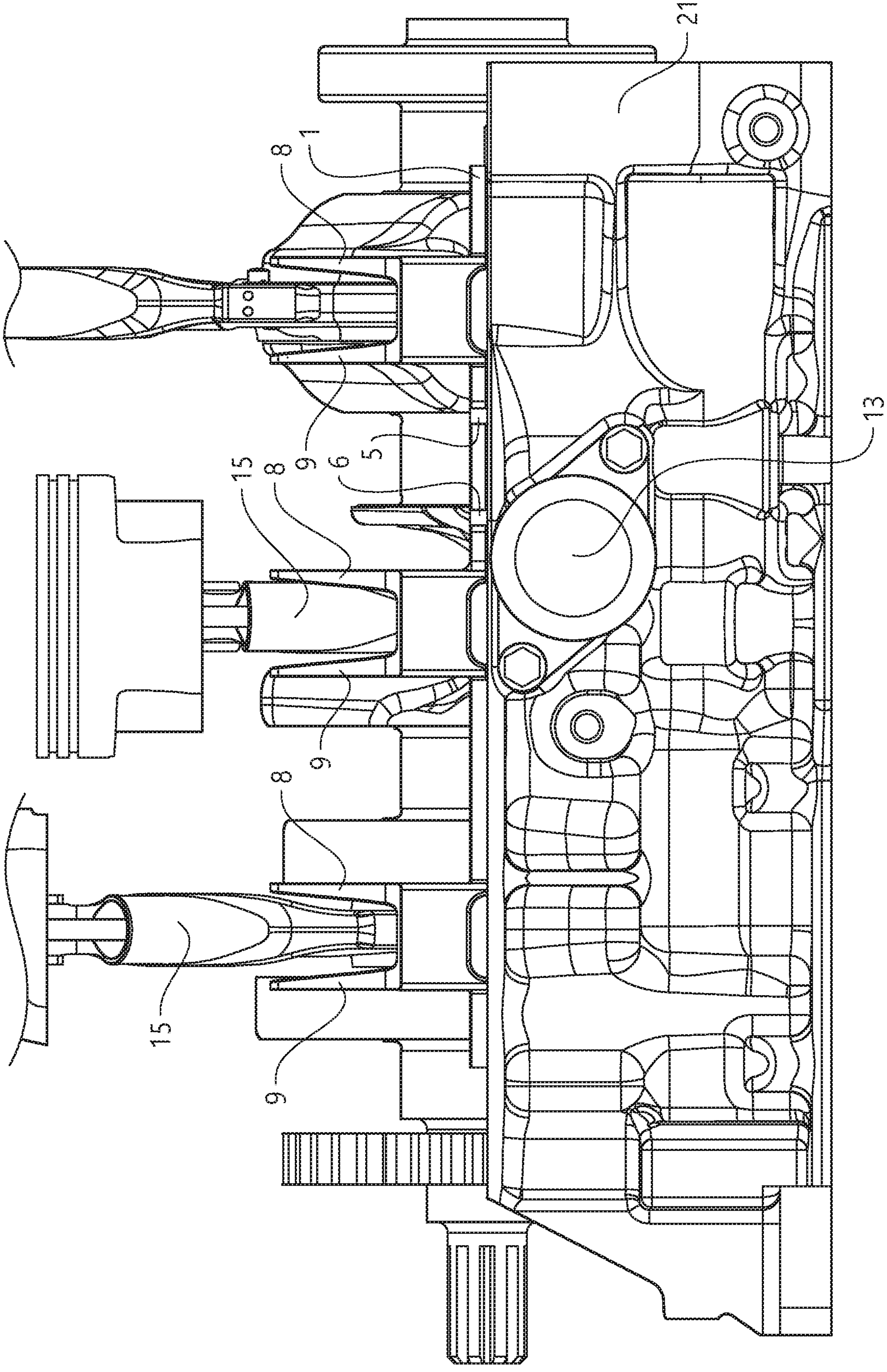
FIG. 2 shows a front view of the switching rack according to the invention standing on a bedplate.

FIG. 2 shows a front view of the switching rack 1. In the shown example, the switching rack is in the left position, i.e. positioned as far left as possible such that the first end stop 5 will bear on the end stop surface 25 of the mounting groove 22. The first cam 8 will now be able to interact with the switch of the connecting rod such that the switch will be pushed to a second position every time the switch passes the first cam, i.e. at every revolution. The second position may e.g. allow oil to flow to the second cylinder, such that the piston mount is in the lower position.

Figure 3:
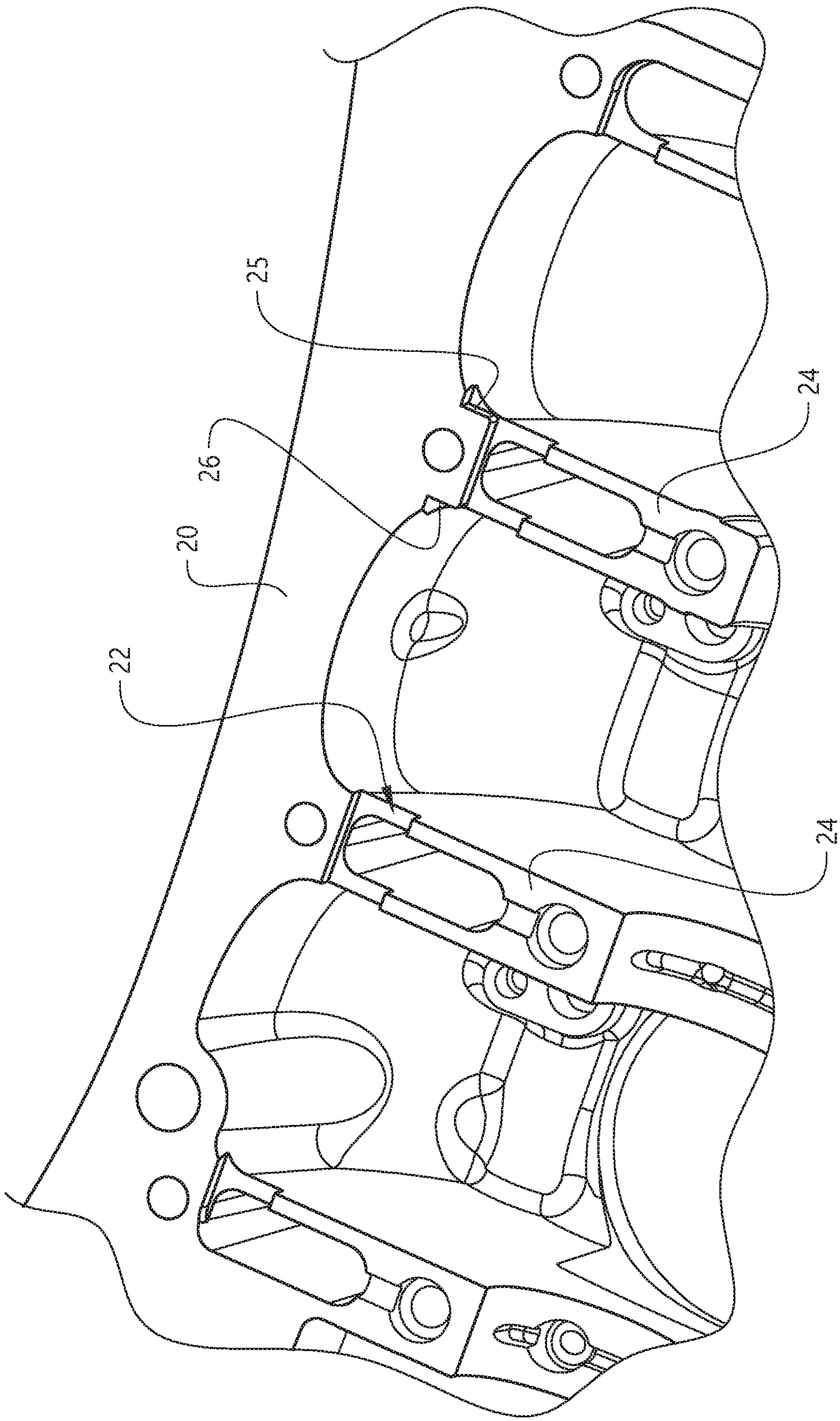
FIG. 3 shows a bottom view of a cylinder block with a groove for a switching rack according to the invention.

FIG. 3 shows a bottom view of a cylinder block 20 with a groove 22 for a switching rack 1. The groove is provided in each bearing bridge 24 of the cylinder block. The groove 22 further comprises a first end stop surface 25 and a second end stop surface 26 adapted to interact with the first endstop 5 respectively the second end stop 6 of the switching rack. The face side 3 of the switching rack 1 will bear and slide in the groove 22 in the cylinder block.

Figure 4:
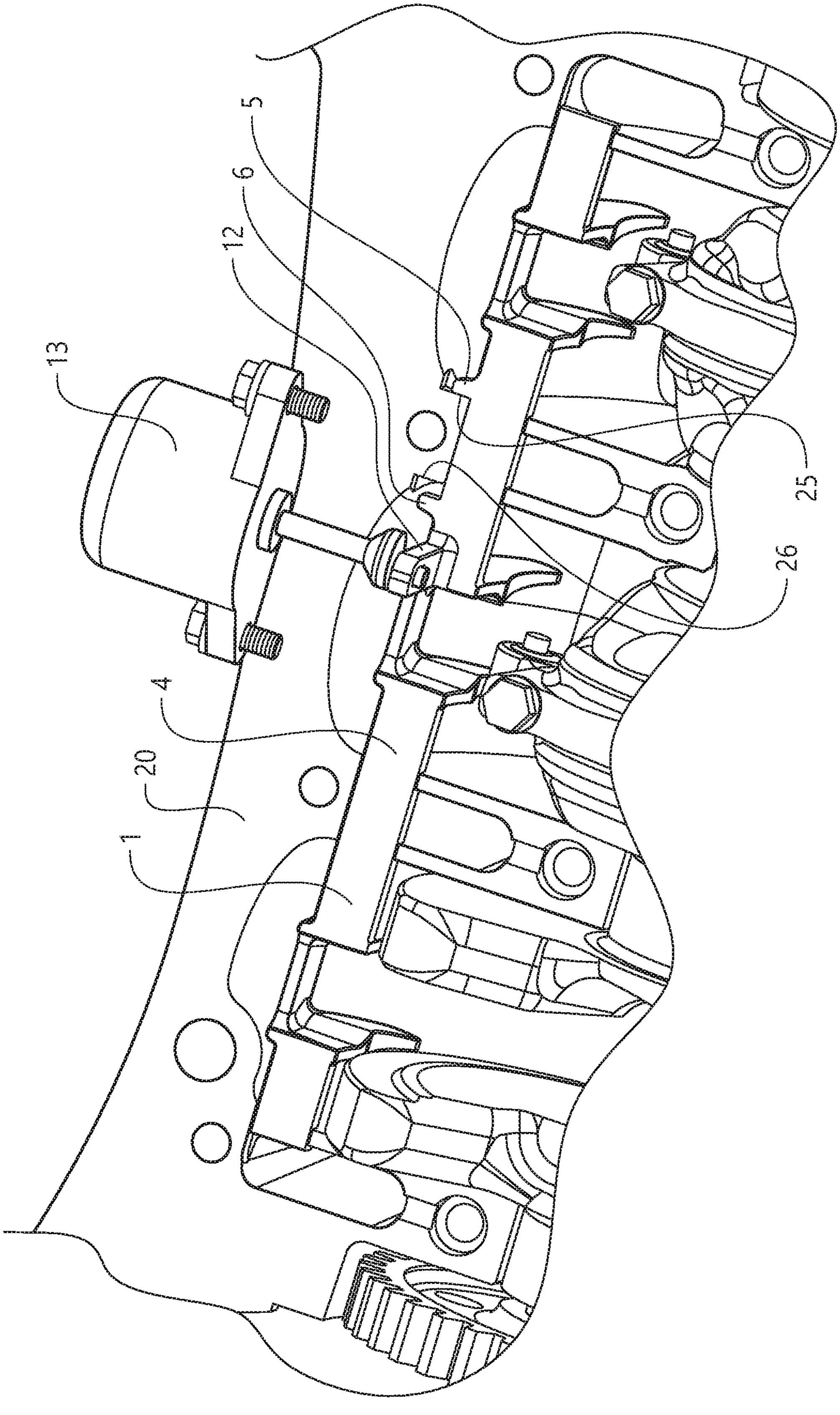
FIG. 4 shows a bottom view of a cylinder head with a switching rack according to the invention.

FIG. 4 shows a switching rack 1 positioned in the groove 22 of the cylinder block 20. In the shown position, the switching rack is seen from below and is in the left position with the first end stop 5 bearing on the first end stop surface 25. The switching rack is controlled to the left position by the actuator 13 through the actuating lever 12. The actuator is adapted to be attached to the outside of the bedplate.

Figure 5:
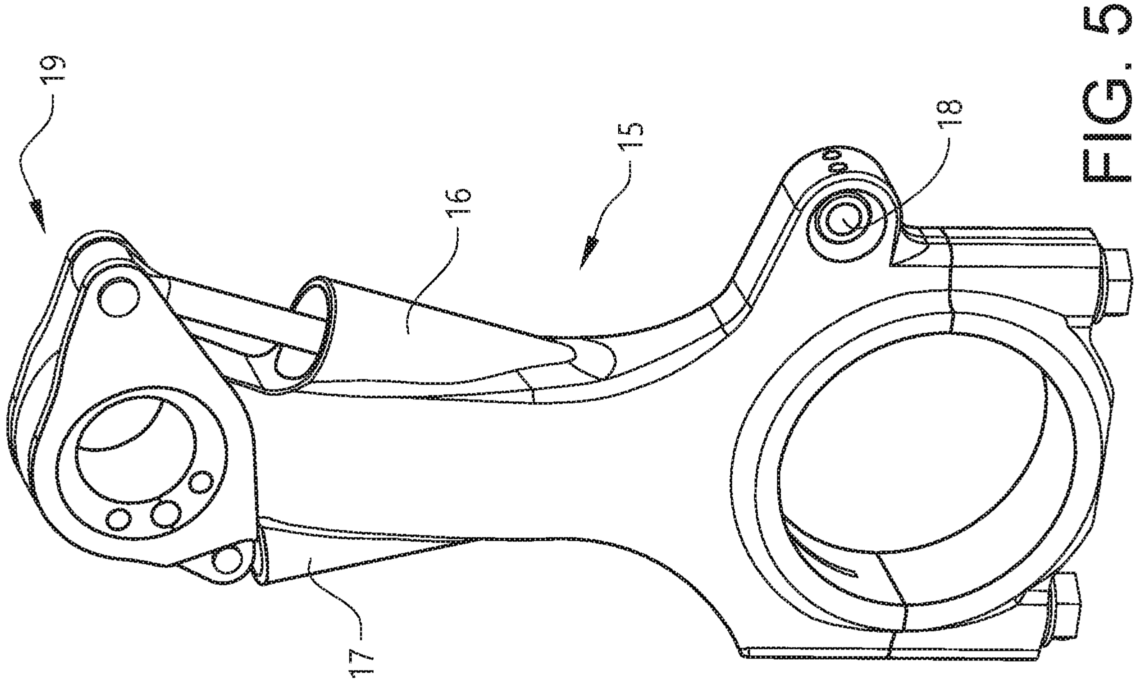
FIG. 5 shows a view of a connecting rod comprising a switch.

FIG. 5 shows a connecting rod 15 arranged to connect a crankshaft to a piston. In the shown figure, the switch 18 is arranged in the upper part of the connecting rod, above the split plane. The switch is arranged at one side of the connecting rod. The switch will switch between two pressurized oil channels comprised in the connecting rod. In the shown first position, the switch will allow oil to flow to a first cylinder 16 arranged at the piston mount 19 of the piston. The first cylinder will position the piston mount in a first, raised position, such that the effective length of the connecting rod will be at its longest extension which corresponds to a high compression ratio. In the second position, the second cylinder 17 will position the piston mount in a second, lower position in which the effective length of the connecting rod is shorter. This will in turn provide a lower compression in the cylinder.

Figure 6:
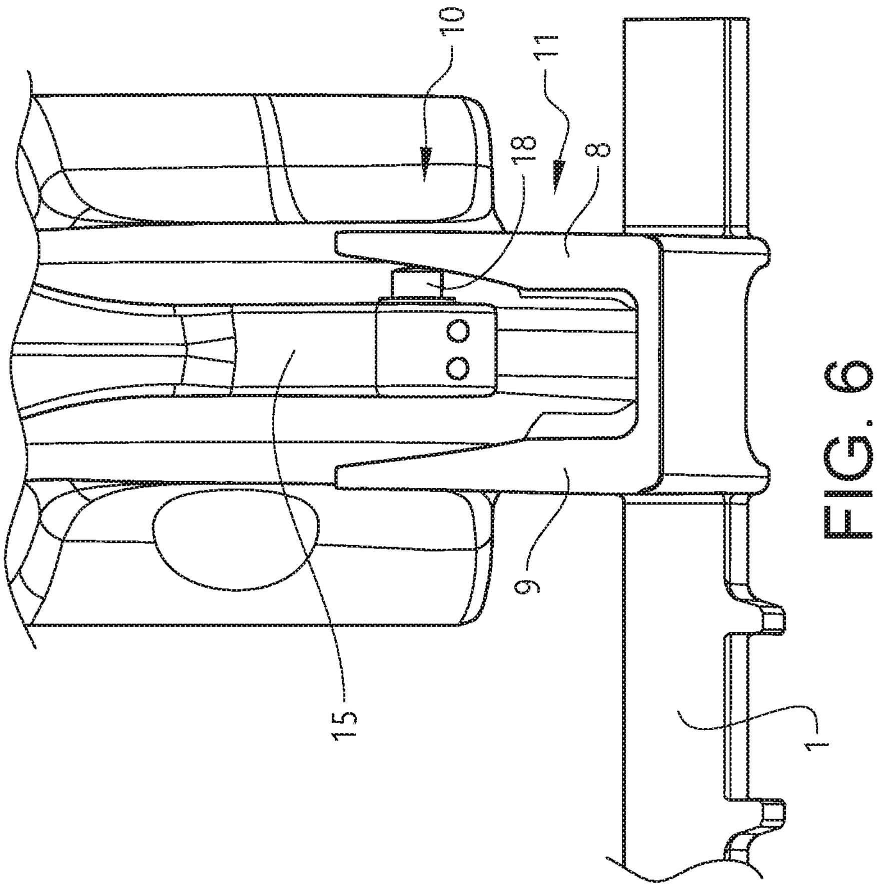
FIG. 6 shows a detail of a switching rack according to the invention during an interaction with a switch.

FIG. 6 shows a detail of the switching rack during an interaction with a switch 18 of a connecting rod 15. In the shown example, the switch is in the second position and the switching rack has just been positioned in the left position. The switch 18 is in the shown example at the entrance region 10 of the first cam 8 and will continue downwards in the figure. The switch will now be pressed into the connecting rod by the inclined surface of the entrance region 10. When the switch continues downwards, it will be pushed in completely into the connecting rod by the switching region 11 and the other end of the switch will extend outwards towards the second cam 9, and the switch will change position to the first position. The switching rack will remain in the left position until a signal is sent to the actuator to change position. This means that the switch will be pushed in every time it passes the first cam if it should displace somewhat, e.g. due to vibrations or the like.

Figure 7:
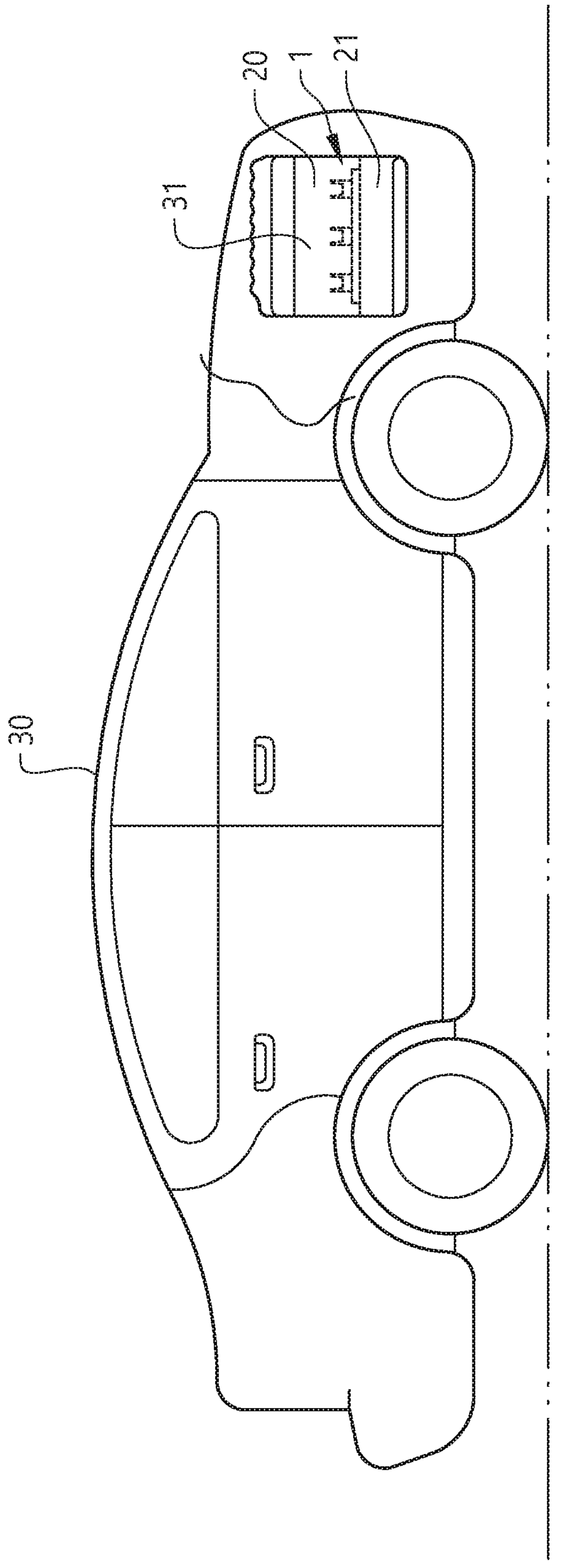
FIG. 7 shows a vehicle comprising an internal combustion engine according to the invention.

FIG. 7 shows a vehicle 30 comprising an internal combustion engine 31. The internal combustion engine 31 comprises a switching rack 1 arranged in groove between the cylinder block 20 and the engine bedplate 21.

The invention is not to be regarded as being limited to the embodiments described above, a number of additional variants and modifications being possible within the scope of the subsequent patent claims.

The invention claimed is:

1. A combustion engine comprising a switching rack and a plurality of connecting rods, where the switching rack comprises a longitudinal body having a face side and a rear side, where the face side comprises a plurality of switching arrangements, where each switching arrangement comprises a first cam and a second cam, where each switching arrangement is adapted to interact with a switch on an associated connecting rod of the plurality of connecting rods, where the switching rack is arranged and glides in a groove between a cylinder block and an engine bedplate of the combustion engine such that the switching rack slides along a longitudinal direction of the longitudinal body relative to the plurality of connecting rods, where the groove is disposed in the cylinder block.

2. The combustion engine of claim 1, where the rear side of the body of the switching rack is provided with an actuating lever adapted to slide the switching rack sideways.

3. The combustion engine of claim 1, where the body of the switching rack comprises a first protruding end stop and a second protruding end stop adapted to cooperate with stop surfaces of the groove.

4. The combustion engine of claim 1, where each cam of the switching rack is provided with an entrance region and a switching region.

5. The combustion engine of claim 1, where the first cam and the second cam of the switching rack extend perpendicular from the face side.

6. The combustion engine of claim 5, where the entrance region and the switching region of each cam in a switching arrangement face each other.

7. The combustion engine of claim 1, where the cross section of the body of the switching rack is rectangular.

8. The combustion engine of claim 1, where a switching arrangement of the switching rack comprises an interconnection which interconnects the first cam with the second cam.

9. The combustion engine of claim 1, where the combustion engine comprises an actuator mounted on the outside of the engine bedplate adapted to control the switching rack.

10. The combustion engine of claim 9, where the actuator is a rotary electric motor.

11. A vehicle comprising the internal combustion engine of claim 1.

12. The combustion engine of claim 1, wherein each switching arrangement is adapted to interact with the switch on the associated connecting rod of the plurality of connecting rods such that the switch on the associated connecting rod is configured to switch between two pressurized oil channels comprised in the associated connecting rod.

13. The combustion engine of claim 12, wherein the switch on the connecting rod is operable to:

selectively supply oil to a first cylinder configured to position a piston mount of a piston in a first, raised position such that an effective length of the connecting rod will be at its longest extension and provide a high compression ratio; or selectively supply oil to a second cylinder configured to position the piston mount of the piston in a second position lower than the first, raised position such that the effective length of the connecting rod is shorter than its longest extension and provides a lower compression ratio than the high compression ratio.

14. The combustion engine of claim 1, wherein the switching rack is configured to slide within the groove along the longitudinal direction between a first position, where the first cam interacts with the switch, and a second position, where the second cam interacts with the switch.

15. The combustion engine of claim 1, wherein mounting the engine bedplate to the cylinder block retains the switching rack within the groove.

16. The combustion engine of claim 1, wherein the switching rack and groove are configured such that the switching rack is prevented from rotating in the groove and a correct vertical and horizontal position of the switching rack is maintained.

17. The combustion engine of claim 1, wherein the cylinder block includes a plurality of bearing bridges, and wherein the groove is defined in each bearing bridge of the cylinder block.

* * * * *